United States Patent Office 2,708,675
Patented May 17, 1955

2,708,675

CHLOROTOLOXY-ETHYL SULFATES

Harold R. Slagh, Midland, Mich., assignor to The Dow Chemical Company, Midland, Mich., a corporation of Delaware No Drawing. Application November 3, 1952, Serial No. 318,512

5 Claims. (Cl. 260—457)

This invention is directed to 2-(4-chloro-o-toloxy) ethyl sulfates having the formula

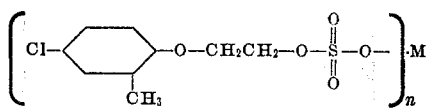

wherein M represents an alkali or alkaline earth metal and $n$ equals the valence of said metal. These compounds are crystalline solids soluble in water and substantially insoluble in non-polar organic solvents. They have been found useful for the control of plant growth and particularly for the killing of germinant seed of undesired vegetation.

The new compounds may be prepared by reacting 2-(4-chloro-o-toloxy)ethanol with chlorosulfonic acid to produce 2-(4-chloro-o-toloxy)ethyl sulfuric acid as an intermediate. This intermediate is thereafter reacted with an alkali or alkaline earth metal hydroxide or carbonate to obtain the desired 4-chloro-o-toloxy-ethyl sulfate product.

In practice, the 2-(4-chloro-o-toloxy)ethanol and the chlorosulfonic acid are mixed together in substantially equimolecular proportions at a temperature of from about 10° to 20° C. The reaction is initiated rapidly and takes place with the evolution of hydrogen chloride gas. Cooling may be necessary during the course of the reaction in order to prevent an excessively rapid reaction resulting from overheating. Upon completion of the reaction, dissolved hydrogen chloride gas is removed by blowing the crude product with a current of air or inert gas. A stoichiometric equivalent amount of an alkali or alkaline earth metal hydroxide or carbonate is then added to obtain the desired alkali or alkaline earth metal 2-(4-chloro-o-toloxy)ethyl sulfate product.

In a preferred method of operation, one molecular proportion of 2-(4-chloro-o-toloxy)ethanol is reacted with one molecular proportion of chlorosulfonic acid in an inert solvent such as carbon tetrachloride with stirring and at a temperature of 15° to 20° C. Cooling means are employed as necessary during the initial vigorous stage of the reaction. As the reaction approaches completion, as evidenced by decreased evolution of hydrogen chloride gas, the mixture is heated for a period of time at gradually increasing temperatures up to the boiling temperature of the inert solvent and under reflux in order to complete the reaction. The crude reaction product is cooled and a current of air passed through it to remove dissolved hydrogen chloride. The resulting product is thereupon reacted with a stoichiometric equivalent amount of an alkali metal or alkaline earth metal hydroxide or carbonate with cooling to produce the desired alkali metal or alkaline earth metal 2-(4-chloro-o-toloxy)ethyl sulfate.

The substituted ethyl sulfate products produced as set forth above may be utilized directly for the control of germinant seeds of undesired vegetation in the crude form. If desired, the products may be further purified by conventional procedures as, for example, by washing with solvents, recrystallization and drying.

The 2-(4-chloro-o-toloxy)ethanol used in preparing the compounds of the present invention may be obtained by reacting an alkali metal 4-chloro-o-cresolate with an equimolecular proportion of ethylene chlorohydrin or ethylene bromohydrin. 2-(4-chloro-o-toloxy)ethanol is a white solid melting at 51°–53° C. and boiling at 115°–119° C. under 1 millimeter pressure. Said 2-(4-chloro-o-toloxy)ethanol is described and claimed as a new compound in the copending application of Dalton B. McCaskey, Serial No. 262,655, filed December 20, 1951, now Patent No. 2,678,336.

The following examples illustrate the invention but are not to be construed as limiting the same:

Example 1

48 grams (0.25 mole) of technical 2-(4-chloro-o-toloxy)ethanol was dissolved in 300 milliliters of carbon tetrachloride and the resulting solution cooled to 15° C. 29.2 grams (0.25 mole) of chlorosulfonic acid was added portionwise to the above solution with stirring over a period of 45 minutes, the reaction vessel being cooled in a cold water bath so as to maintain the mixture at a temperature of from 10° to 18° C. Hydrogen chloride gas was evolved and recovered. Upon completion of the reaction a current of air was blown through the crude product for 15 minutes to recover dissolved hydrogen chloride. A total of 8 grams (0.22 mole) of hydrogen chloride was recovered. Following the above blowing-out step 26 grams of 50 percent aqueous sodium hydroxide solution was added to the crude product with stirring and cooling to produce a sodium 2-(4-chloro-o-toloxy)ethyl sulfate product as a white crystalline precipitate. The latter was separated by filtration, washed with carbon tetrachloride and recrystallized from a mixture comprising 65 milliliters of methanol and 110 milliliters of water. The recrystallized product after drying in a dessicator was found to contain 10.62 percent sulfur and 12.79 percent chlorine by analysis.

Example 2

55.8 grams (0.3 mole) of 2-(4-chloro-o-toloxy)ethanol was dissolved in 250 milliliters of carbon tetrachloride, the resulting solution cooled to 15° C. and reacted with 35 grams (0.3 mole) of chlorosulfonic acid. The chlorosulfonic acid was added portionwise over a period of 15 minutes at a temperature of from 15° to 20° C. The reaction mixture was then heated gradually with stirring for another 15 minutes up to the boiling temperature of the carbon tetrachloride solvent and under reflux. The crude reaction product was cooled and blown with air to obtain a residue consisting essentially of 2-(4-chloro-o-toloxy)ethyl sulfuric acid.

6.6 grams (0.1 mole) of potassium hydroxide (85 percent by assay) dissolved in 10 milliliters of water was added to ⅓ of the above ethyl sulfuric acid product. A white precipitate formed and was separated by filtration. This residue was washed with carbon tetrachloride and dried to obtain a potassium 2-(4-chloro-o-toloxy)ethyl sulfate product as a white crystalline powder, very soluble in water.

Example 3

To another third of the ethyl sulfuric acid product of Example 2 was added 4.2 grams (0.05 mole) of magnesium carbonate suspended in 5 milliliters of water. Carbon dioxide was evolved and a white precipitate formed. The latter was separated by filtration, washed with carbon tetrachloride and dried to obtain a magnesium 2-(4-chloro-o-toloxy)ethyl sulfate product as a white crystalline product, moderately soluble in water.

Example 4

Following the procedure of Example 3, 5 grams (0.05 mole) of calcium carbonate suspended in 5 milliliters of water was added to a further third of the ethyl sulfuric acid product of Example 2 and the resulting precipitate separated to obtain a calcium 2-(4-chloro-o-toloxy)ethyl sulfate product as a white crystalline powder, somewhat soluble in water.

Areas of greenhouse potting soil were fitted and planted with tampala, radish and lettuce seed. Sodium 2-(4-chloro-o-toloxy)ethyl sulfate was applied to the above fitted and planted area at the rate of 4 pounds per acre. The sulfate compound was applied as a solution in sufficient water to wet thoroughly the surface of the treated soil area. Similar fitted and planted areas were left untreated to serve as a control. Observation several weeks after the treatment showed no apparent germination or growth of any of the test species in the treated area. In contrast, seed of all species in the untreated area had germinated and made vigorous growth.

I claim:
1. 2-(4-chloro-o-toloxy)ethyl sulfates having the formula

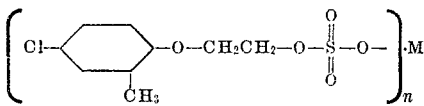

wherein M represents a member of the group consisting of alkali metals and alkaline earth metals and $n$ equals the valence of said metal.
2. Sodium 2-(4-chloro-o-toloxy)ethyl sulfate.
3. Potassium 2-(4-chloro-o-toloxy)ethyl sulfate.
4. Calcium 2-(4-chloro-o-toloxy)ethyl sulfate.
5. Magnesium 2-(4-chloro-o-toloxy)ethyl sulfate.

References Cited in the file of this patent

UNITED STATES PATENTS

| | | |
|---|---|---|
| 1,644,524 | Hentrich et al. | Oct. 4, 1927 |
| 2,573,769 | Lambrech | Nov. 6, 1951 |